United States Patent Office

3,062,743
Patented Nov. 6, 1962

3,062,743
EXTREME PRESSURE LUBRICANT ADDITIVE
AND LUBRICANT COMPOSITION
Allan A. Manteuffel and Warren W. Cortiss, Crystal Lake, Ill., assignors to The Pure Oil Company, Chicago, Ill., a corporation of Ohio
No Drawing. Filed Oct. 30, 1959, Ser. No. 849,763
12 Claims. (Cl. 252—46.7)

This invention relates to an improved extreme-pressure lubricant, and more particularly, to a lubricant which gives superior protection in extreme-pressure lubrication of phosphate-coated gears.

Extreme-pressure lubricants have found extensive use in the lubrication of gear transmissions of trucks and other motor vehicles. The lubrication of gears demands lubricants of special qualities, particularly high lubricity and high film strength. When a lubricant is compressed between two moving metallic surfaces, high film strength is necessary to prevent the escape or squeezing out of said lubricant from between said surfaces, which may result in spot welding of the contacting surfaces. The extreme pressures to which such lubricants are subjected when compressed between the gear surfaces cause a rise in the internal heat which is augmented by any friction generated by lack of point lubricity. It has been found that petroleum lubricating oil fractions alone are unsatisfactory in that they do not have requisite high lubricity and high film strength and consequently allow scoring and welding of gears on continued use, together with oil breakdown because of heat generated due to high friction, etc.

Many types of additives have been prepared and used in conjunction with petroleum lubricating oils for the purpose of augmenting film strength, lubricity, and other desired characteristics for use in extreme-pressure applications. In particular, sulfurized, or sulfurized-and-phosphorized, fatty materials have been added in various amounts and in combination with other additives to lubricating oils to provide high film strength and lubricity for use in extreme-pressure applications.

The ability of extreme-pressure lubricants to withstand extreme-pressure conditions, and conditions of high speed and high wear, has previously been evaluated by means of the CRC L-19 and CRC L-20 tests, wherein the lubricants are subjected to conditions simulating those occurring in use in automobile and truck gears under conditions of low speed and high torque, and high speed and low torque. These tests have recently been superseded by newly devised tests which are used for evaluation of extreme-pressure lubricants under the more severe conditions encountered in present-day automotive and truck engines. The ability of extreme-pressure lubricants to withstand the severe operating conditions encountered today is now evaluated by the CRC L-37 and CRC L-42 tests wherein actual severe use is simulated under closely controlled conditions. In these tests, the ability of the lubricants to protect gears is determined in high-speed-low-torque, low-speed-high-torque, and high-speed-high-torque operations, both for uncoated and phosphate-coated gears. In the copending patent application of Paul R. Chapman et al., Serial No. 757,856, filed August 28, 1958, there is described a modified form of four-ball extreme-pressure lubricant tester which evaluates extreme-pressure lubricants in terms of a pressure-temperature relationship which correlates very accurately with the results obtained in the CRC L-37 and CRC L-42 tests.

In Chapman et al., Patent 2,910,438, there is described an improved extreme-pressure additive, the method of preparation of such additive, and a gear oil containing the improved additive. In this patent, a process is described in which a fatty material is sulfurized by heating with 5–10% wt. of sulfur at a temperature of 315°–360° F. for a period of 2.5–6 hours until a tan copper strip endpoint (1-minute immersion at 300° F.) is obtained. The sulfurized material is then phosphorized with 0.8–5.0% wt. of phosphorus sesquisulfide at 220°–235° F. until a tan copper strip end-point (3-minute immersion at 240° F.) is obtained. The extreme-pressure additive which is prepared in accordance with this patent, when dissolved in a petroleum lubricating oil, produces an extreme-pressure lubricant which is characterized by its ability to pass both the CRC L-19 and CRC L-20 tests, which was beyond the capacity of previous extreme-pressure lubricants. Recently, however, it has been found that while the extreme-pressure lubricant additive and lubricating oils containing said additive prepared in accordance with the Chapman et al. patent will pass the CRC L-19 and CRC L-20 tests, there are problems encountered when these lubricants are evaluated under the more severe conditions of the CRC L-37 and CRC L-42 tests. These lubricants have proved to be satisfactory in the CRC L-37 and CRC L-42 tests in conjunction with uncoated gears, but have failed to pass both of these tests when used with the phosphate-coated gears.

It is therefore one object of this invention to provide an improved extreme-pressure lubricant characterized by its ability to provide extreme-pressure protection in use with phosphate-coated gears.

A feature of this invention is the provision of an extreme-pressure lubricant consisting essentially of a sulfurized and phosphorized fatty material containing in admixture therewith a small percentage of a low-molecular-weight polyethoxydiamine.

Another feature of this invention is the provision of an improved extreme-pressure lubricant additive which comprises a sulfurized and phosphorized fatty material in admixture with a small proportion of a polyethoxydiamine produced by reaction of N-alkyl trimethylene diamine, in which the alkyl group is derived from naturally occurring fats (including fatty oils), with three to eight mols of ethylene oxide.

Another feature of this invention is the provision of an improved extreme-pressure lubricant consisting of a petroleum lubricating oil containing a sulfurized and phosphorized fatty material in an amount sufficient to enhance the extreme-pressure properties thereof and a small proportion of a polyethoxydiamine in an amount sufficient to enhance the extreme-pressure properties of the lubricant for use with phosphate-coated gears.

Other objects and features of this invention will become apparent from time to time throughout the specification and claims as hereinafter related.

In general, our invention comprises a composition consisting essentially of a mixture of a fatty material which has been sulfurized by reaction with 5–10% of sulfur at 315°–360° F. and phosphorized by subsequent reaction with a phosphorus sulfide at 220°–235° F., with 0.25–10% wt. (preferably about 1.0–2.5%) of a polyethoxydiamine produced by reaction of 3 to 8 mols of ethylene oxide with 1 mol of N-alkyl-substituted trimethylene diamine in which the alkyl group is derived from naturally occurring fats, such as coconut oil, tallow, soya oil, etc. The composition thus prepared is dissolved in a petroleum lubricating oil to produce an extreme-pressure lubricant having substantially enhanced extreme pressure properties when used with phosphate-coated gears.

In the copending application of Paul R. Chapman et al., Serial No. 757,856, filed August 28, 1958, there is described an apparatus for testing extreme-pressure lubricants which is a modified four-ball test machine. The modified four-ball test machine of Chapman et al. consists of an arrangement of four steel balls in the form of an equilateral tetrahedron, with three of the balls being held stationary and the fourth being rotated against them by means of a motor-driven chuck. The balls are immersed in the lubricant under test. Rotation of the upper ball at a standard speed is started and the load on the upper ball is increased gradually while recording the oil temperature by means of a thermometer or a thermocouple located at a point near the wearing surface between two of the balls. The resulting recorded relationship between the load and oil temperature is plotted as a temperature-load curve. At the same time, the torque imposed upon the stationary balls is recorded in relation to the applied load, and the recorded relationship is plotted as a torque-load curve. It is apparent that both the temperature and torque at any given load are dependent upon the amount of friction at the rubbing surfaces of the balls. As the load is increased, the friction tends to increase, with the result that the temperature and torque also increase. This increase is generally uniform under conditions of normal lubrication. However, as the load and friction increase, there may occur chemical and physical changes in the metal-lubricant system which result in very rapid changes in temperature and/or torque at the limit of operation of the lubricant. Probably the greatest rate of change is noted when seizure occurs between the surfaces of adjacent balls or when there is a very sudden and rapid rise in temperature at a substantially constant load. The point of seizure or very rapid rise in temperature is noted as the "break point" or transition point for the lubricant. It has been found that lubricants which are capable of passing the CRC L-37 and CRC L-42 tests on phosphate-coated gears have "break points" at loads greater than 180 kg. in this test (using phosphate-coated balls). Similar correlations have been found between the temperature-load curve and torque-load curve with respect to the CRC L-19 and CRC L-20 tests so that the results obtained with the modified four-ball machine may be considered to be indicative of the performance of the lubricant in the CRC L-19, L-20, L-37, or L-42 tests, according to the results obtained in the instant apparatus.

In investigating the preparation of various extreme-pressure lubricant additives, we have attempted to prepare extreme-pressure additives which are stable on storage (do not give an observable precipitate or liquid separation after 30 days' storage at room temperature), and which have a break point in excess of 180 kg. on the modified four-ball test machine, or which will pass the CRC L-37 and CRC L-42 tests using phosphate-coated steel balls or phosphate-coated gears in the respective tests. The following non-limiting examples are illustrative of the scope of this invention.

EXAMPLE I

A quantity of 55° winter sperm oil was placed in a kettle and heated to 275°–285° F. Then, while stirring the mixture, 9.9% wt. (based on the amount of sperm oil) of sulfur was added and reacted for about 4.25 hours at 310°–320° F., at which time a copper strip corrosion test taken for 1 minute at 300° F. gave a dark peacock to bronze copper strip. The sulfurized sperm oil was cooled quickly to 226° F. and 1.2% wt. (based on the sulfurized oil) of phosphorous sesquisulfide was added. The reaction with this material was carried on at 220°–235° F. for about 3 hours, at which time, a copper strip test (3 minutes at 220° F.) gave a light peacock copper strip. The sulfurized and phosphorized product was cooled and used in the formulation of various lubricating oil compositions.

When a lubricating oil composition is prepared by admixture of about 89% wt. of 170 vis., 100 V.I. neutral oil and 11% of sulfurized and phosphorized sperm oil prepared as above described, there is obtained a product which has excellent extreme-pressure properties. This extreme-pressure lubricant oil composition will pass the CRC L-19 and CRC L-20 tests and is capable of passing the CRC L-37 and L-42 tests on uncoated gears, but fails those tests on phosphate-coated gears. This lubricating oil composition, when run in the modified four-ball test machine, gives a break point of about 150 kg.

When a portion of the extreme-pressure lubricant, containing 10% of a sulfurized and phosphorized sperm oil, is mixed with 0.1% wt. (1% wt. based on the extreme-pressure additive) of polyethoxydiamine produced by reaction of one mol of N-tallow trimethylene diamine with three mols of ethylene oxide, there is obtained an extreme-pressure lubricant which is stable upon storage and shows no settling of either liquid or solid phases after 30 days. This extreme-pressure lubricant, when tested in the modified four-ball test machine, using phosphate-coated balls, shows a break point of about 190 kg. The improvement in extreme-pressure properties of the sulfurized and phosphorized fatty material which results from the addition of 0.25–10.0% wt., based on the sulfurized and phosphorized fatty oil, of the polyethoxydiamine is realized whether used with a lubricating oil in the absence of other additives or in a lubricating oil composition containing other materials, such as corrosion inhibitors, pour point depressants, V.I. improvers, and the like.

EXAMPLE II

A quantity of sulfurized and phosphorized sperm oil prepared as in Example I was formulated into an extreme-pressure lubricant in the following proportions.

| Component: | Weight percent |
|---|---|
| Sulfurized and phosphorized sperm oil | 10.0 |
| Dibenzyl disulfide | 1.0 |
| Acryloid 150 [1] | 0.5 |
| 160 vis., 90 V.I. bright stock | 50.0 |
| 170 vis., 100 V.I. neutral oil | 38.5 |

[1] Acryloid 150 is a viscosity index improver and pour point depressant, is a methacrylate polymer and is described more fully in U.S. Patent No. 2,681,891.

This extreme pressure lubricant composition was tested in the modified four-ball test machine using phosphate-coated balls and was found to have a break point of 155 kg. This same lubricant, when tested in the CRC L-37 and L-42 tests, passed said tests when uncoated gears were used, but failed both tests when phosphate-coated gears were used.

EXAMPLE III

In another experiment, a sample of the extreme-pressure lubricant prepared in Example II was mixed with 0.1% wt., based on the total composition (or 1%, based on the extreme-pressure additive), of Ethoduomeen T13 (product of Armour & Co.), which is a polyethoxydiamine of the formula $$R-\underset{|}{N}-CH_2CH_2CH_2N\begin{matrix}C_2H_4OH\\ \diagup\\ \diagdown\end{matrix}\begin{matrix}C_2H_4OH\\ \\ C_2H_4OH\end{matrix}$$

where R is a mixture of saturated and unsaturated aliphatic radicals derived from tallow. The resulting composition was stable and showed no settling of solid or liquid sediment after 30 days. This product was tested in the modified four-ball test machine and had a break point of 205 kg.

In another experiment, a portion of the extreme-pressure lubricant of Example II was mixed with 0.1% wt. of Ethoduomeen C13 (product of Armour & Co.), which is a polyethoxydiamine of the formula $$R-\underset{|}{N}-CH_2CH_2CH_2N\begin{matrix}C_2H_4OH\\ \diagup\\ \diagdown\end{matrix}\begin{matrix}C_2H_4OH\\ \\ C_2H_4OH\end{matrix}$$

where R is a mixture of saturated and unsaturated aliphatic radicals derived from coconut oil, and produced a product which was stable and showed no evidence of solid sediment or liquid phase separation after 30 days. This product, when tested in the modified four-ball test machine, had a break point of 190 kg. When the sulfurized and phosphorized extreme-pressure additive is mixed with 0.25–10% wt. of the polyethoxydiamine, there is obtained a stable product which when added to a lubricating oil produces an extreme-pressure lubricant satisfactory for use with phosphate-coated gears.

In these and other experiments, we have found that the addition of 0.25–10.0% wt., based on the sulfurized and phosphorized fatty oil, of a polyethoxydiamine of the formula

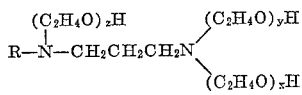

where R is a mixture of aliphatic radicals derived from naturally occurring fats, and $x$, $y$, and $z$ are small integers (including zero) which total 3 to 8, forms a lubricant additive composition with a sulfurized and phosphorized fatty oil which when compounded with a petroleum lubricating oil, with or without other additives, gives an extreme-pressure lubricant composition which has superior extreme-pressure properties for use in the lubrication of phosphate-coated gears. This improvement in extreme-pressure properties is realized regardless of the fatty oil or other fatty material from which the extreme-pressure additive is formed. Thus, an extreme-pressure additive may be prepared by sulfurization and phosphorization of any fatty material as above described. The term "fatty material," as used herein, includes any and all naturally occurring fats and fatty oils and synthetic fats or fatty oils, and includes fatty acid esters of alcohols, glycols, glycerol, pentaerythritol, and other polyols. Thus, naturally occurring fats, such as animal fats, tallow, and the like, fatty oils, such as lard oil, sperm oil, cotton-seed oil, soya oil, etc., and synthetic fatty oils and fats, such as ethyleneglycol dioleate, methyl esters of lard oil, propyleneglycol distearate, tetraethyleneglycol distearate, and pentaerythritol tetrapalmitate may be sulfurized and phosphorized to prepare the desired extreme-pressure additive. The polyethoxydiamine compounds which are useful in admixture with the sulfurized and phosphorized fatty material for enhancing the extreme-pressure properties when used for lubrication of phosphate-coated gears include the Ethoduomeens (product of Armour & Co.) which are the reaction products of N-alkyl trimethylene diamine, where the "alkyl" radical is a mixture of saturated and unsaturated aliphatic radicals having 12 to 18 carbon atoms and derived from naturally occurring fats, with ethylene oxide in a mol ratio in the range from 1:3 to 1:8. These compounds therefore have the formula

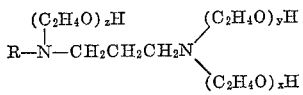

where R is selected from the group consisting of $C_{12}$–$C_{18}$ aliphatic radicals, and $x$, $y$, and $z$ are small integers, including zero, which total from 3 to 8. We have found that Ethoduomeens which contain less than 3 mols of ethylene oxide or more than 8 mols of ethylene oxide are ineffective for the purpose of this invention. Likewise, the reaction products of other fatty nitrogen compounds with ethylene oxide are also ineffective for the purpose of this invention as will be demonstrated in a subsequent example.

EXAMPLE IV

In a series of experiments, samples of the sulfurized and phosphorized sperm oil lubricant composition prepared in Example II were mixed with 0.1% wt. (based on the total weight of composition) of various ethylene oxide-fatty nitrogen compound reaction products. In Table I, there are set forth several examples of the compositions which were prepared, identifying the additive material which was used and indicating the stability of the product and the four-ball break point in kilograms as measured on the modified four-ball test machine.

Table I

| Additive | Stability | Four-Ball Break Point, Kilograms |
|---|---|---|
| Ethoduomeen T 25 [1] | Unstable | 150 |
| Ethoduomeen T 20 [2] | do | 160 |
| Ethofat 142/15 [3] | do | 160 |
| Ethofat 242/15 [4] | do | 160 |
| Ethofat 60/15 [5] | Stable | 150 |
| Ethomeen S 15 [6] | do | 165 |
| Ethomid HT/25 [7] | Unstable | 150 |

[1] Reaction product of N-tallow trimethylene diamine with 15 mols of ethylene oxide.
[2] Reaction product of N-tallow trimethylene diamine with 10 mols of ethylene oxide.
[3] Reaction product of red oil fatty acids with 5 mols of ethylene oxide.
[4] Reaction product of 70% rosin fatty acids with 5 mols of ethylene oxide.
[5] Reaction product of stearic acid with 5 mols of ethylene oxide.
[6] Reaction product of (primary) soya amine with 5 mols of ethylene oxide.
[7] Reaction product of hydrogenated tallow amide with 15 mols of ethylene oxide.

In the table, the compositions indicated to be stable showed no sedimentation or separation of a liquid phase after 30 days' storage. Compounds which are indicated to be unstable showed a sedimentation or phase separation after 30 days' storage. From the data in Table I, it is seen that the addition of polyethoxydiamines (Ethoduomeens) containing 10 or more mols of combined ethylene oxide yielded an unstable lubricant composition which was no better than the sulfurized-phosphorized sperm oil alone with respect to the break point measured in the modified four-ball test apparatus using phosphate-coated balls. Compositions 3 to 5 in Table I, which contained polyethyleneglycol esters of fatty acids or rosin acids were unsatisfactory with respect to either the four-ball break point or product stability. Compositions 5 and 6 which contained the reaction products of ethylene oxide and a fatty amine or fatty amide were similarly unsatisfactory with respect to the four-ball break point and one of the compositions was unsatisfactory from a standpoint of storage stability.

From these and other experiments, we have found that an extreme-pressure lubricant composition consisting essentially of a petroleum lubricating oil (with or without other additives) and a sulfurized and phosphorized fatty material (any fatty material as previously defined) will produce a satisfactory extreme-pressure lubricant for use in the lubrication of phosphate-coated gears when there is incorporated in the composition 0.25–10.0% wt. (based on the sulfurized and phosphorized fatty material) of a polyethoxydiamine of the formula

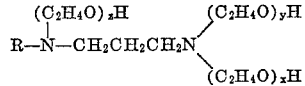

where R is selected from the group consisting of $C_{12}$–$C_{18}$ aliphatic radicals derived from natural fats, and $x$, $y$, and $z$ are small integers, including zero, which total from 3 to 8. Other ethylene oxide-fatty nitrogen compound reaction products are unsatisfactory in compositions of this type as are polyethoxydiamines of the general formula given above which contain less than 3 mols of ethylene oxide or more than 8 mols. When lubricants of the preferred composition are prepared and tested in automotive or truck gears following the procedure of the CRC L-37 and CRC L-42 tests, it is found that these gears may be operated under the rigorous conditions of the tests without scoring or discoloration of the gears, both with uncoated gears and with phosphate-coated gears.

Having thus described our invention with special emphasis upon several preferred embodiments thereof, we

The embodiments of the invention in which an exclusive property or privilege is claimed are defined as follows.

We claim:

1. An extreme-pressure lubricant additive consisting of a phosphorized and sulfurized fatty material and 0.25–10.0% wt. of a polyethoxydiamine of the formula

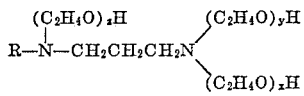

where R is selected from the group consisting of $C_{12}$–$C_{18}$ aliphatic radicals, and $x$, $y$, and $z$ are small integers, including zero, which total from 3 to 8.

2. An extreme-pressure lubricant additive in accordance with claim 1 in which the phosphorized and sulfurized fatty material is prepared by heating the fatty material with 5–10% wt. of sulfur at 310°–375° F. for 2.5–6 hours to a copper strip end-point, as measured by 1-minute immersion at 300° F., in the range from dark peacock to bronze, and reacting the sulfurized fatty material with at least 0.8% wt. phosphorus sesquisulfide at 220°–235° F. to a copper strip end-point, as measured by 3-minute immersion at 220° F., which is not darker than light peacock.

3. An extreme-pressure lubricant additive in accordance with claim 2 in which R in the polyethoxydiamine is a mixture of aliphatic radicals derived from tallow.

4. An extreme-pressure lubricant additive in accordance with claim 2 in which R in the polyethoxydiamine is a mixture of aliphatic radicals derived from coconut oil.

5. An extreme-pressure lubricant additive in accordance with claim 2 in which R in the polyethoxydiamine is a mixture of aliphatic radicals derived from soybean oil.

6. An extreme-pressure lubricant additive consisting essentially of a phosphorized and sulfurized fatty material and 1.0–2.5% wt. of a polyethoxydiamine of the formula

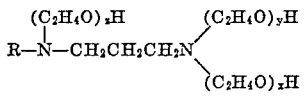

where R is a mixture of aliphatic radicals derived from a naturally occurring fat and $x$, $y$, and $z$ are small integers, including zero, which total 3.

7. An extreme-pressure lubricant consisting essentially of a petroleum lubricating oil, sufficient amount of a phosphorized and sulfurized fatty material to impart extreme-pressure properties to the oil, and 0.25–10.0% wt., based on the phosphorized and sulfurized fatty material, of a polyethoxydiamine of the formula

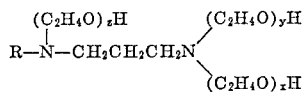

where R is selected from the group consisting of $C_{12}$–$C_{18}$ aliphatic radicals, and $x$, $y$, and $z$ are small integers, including zero, which total from 3 to 8.

8. An extreme-pressure lubricant in accordance with claim 7 in which the phosphorized and sulfurized fatty material is prepared by heating the fatty material with 5–10% wt. of sulfur at 310°–375° F. for 2.5–6 hours to a copper strip end-point, as measured by 1-minute immersion at 300° F., in the range from dark peacock to bronze, and reacting the sulfurized fatty material with at least 0.8% wt. phosphorus sesquisulfide at 220°–235° F. to a copper strip end-point, as measured by 3-minute immersion at 220° F., which is not darker than light peacock.

9. An extreme-pressure lubricant in accordance with claim 8 in which R in the polyethoxydiamine is a mixture of aliphatic radicals derived from tallow.

10. An extreme-pressure lubricant in accordance with claim 8 in which R in the polyethoxydiamine is a mixture of aliphatic radicals derived from coconut oil.

11. An extreme-pressure lubricant in accordance with claim 8 in which R in the polyethoxydiamine is a mixture of aliphatic radicals derived from soybean oil.

12. An extreme-pressure lubricant consisting essentially of a petroleum lubricating oil and about 10% wt. of an extreme-pressure lubricant additive composition as defined in claim 1.

References Cited in the file of this patent

UNITED STATES PATENTS

| | | |
|---|---|---|
| 2,857,330 | Hall | Oct. 21, 1958 |
| 2,910,438 | Chapman et al. | Oct. 27, 1959 |
| 2,917,160 | Turinsky | Dec. 15, 1959 |

OTHER REFERENCES

"Armour Etho-Chemicals," pub. by Armour Chemical Div., 1955, pp. 2–4.

UNITED STATES PATENT OFFICE
CERTIFICATE OF CORRECTION

Patent No. 3,062,743                        November 6, 1962

Allan A. Manteuffel et al.

It is hereby certified that error appears in the above numbered patent requiring correction and that the said Letters Patent should read as corrected below.

In the heading to the printed specification, line 7, for "Filed Oct. 30, 1939" read -- Filed Oct. 30, 1959 --.

Signed and sealed this 14th day of May 1963.

(SEAL)
Attest:

ERNEST W. SWIDER
Attesting Officer

DAVID L. LADD
Commissioner of Patents